(12) United States Patent  
Feng

(10) Patent No.: US 8,543,067 B2  
(45) Date of Patent: Sep. 24, 2013

(54) COMMUNICATION DEVICE AND COMMUNICATION METHOD EMPLOYING THE SAME

(75) Inventor: Jian-Yan Feng, Shenzhen (CN)

(73) Assignees: Shezhen Futaihong Precision Industry Co., Ltd., Shenzhen (CN); Chi Mei Communications Systems, Inc., New Taipei (TW)

( * ) Notice: Subject to any disclaimer, the term of this patent is extended or adjusted under 35 U.S.C. 154(b) by 832 days.

(21) Appl. No.: 12/694,411

(22) Filed: Jan. 27, 2010

(65) Prior Publication Data

US 2010/0330907 A1 Dec. 30, 2010

(30) Foreign Application Priority Data

Jun. 30, 2009 (CN) .......................... 2009 1 0303875

(51) Int. Cl.
*H04B 1/00* (2006.01)

(52) U.S. Cl.
USPC ............ 455/69; 455/522; 455/13.4; 455/574; 370/318

(58) Field of Classification Search
USPC ........ 455/69, 522, 13.4, 574, 127.1; 370/318
See application file for complete search history.

(56) References Cited

U.S. PATENT DOCUMENTS

| | | | | |
|---|---|---|---|---|
| 5,673,259 A | * | 9/1997 | Quick, Jr. ...................... | 370/342 |
| 5,881,368 A | * | 3/1999 | Grob et al. ...................... | 455/69 |
| 5,884,196 A | * | 3/1999 | Lekven et al. ................. | 455/574 |
| 5,983,099 A | * | 11/1999 | Yao et al. ..................... | 455/426.1 |
| 7,103,321 B2 | | 9/2006 | Xiong | |
| 7,395,056 B2 | * | 7/2008 | Petermann ................. | 455/422.1 |
| 7,525,289 B2 | * | 4/2009 | Janik et al. ..................... | 320/158 |
| 7,551,921 B2 | * | 6/2009 | Petermann ................. | 455/422.1 |
| 8,106,539 B2 | * | 1/2012 | Schatz et al. ................... | 307/104 |
| 8,259,659 B2 | * | 9/2012 | Luft et al. ..................... | 370/329 |
| 2005/0286466 A1 | * | 12/2005 | Tagg et al. ..................... | 370/329 |
| 2008/0298275 A1 | * | 12/2008 | De Sousa ..................... | 370/255 |
| 2009/0080490 A1 | * | 3/2009 | Mowry et al. ..................... | 374/1 |
| 2009/0092392 A1 | * | 4/2009 | Huang et al. ..................... | 398/79 |
| 2009/0286565 A1 | * | 11/2009 | Liu et al. ....................... | 455/522 |
| 2009/0323257 A1 | * | 12/2009 | Sarid et al. ..................... | 361/631 |
| 2010/0002582 A1 | * | 1/2010 | Luft et al. ................... | 370/230.1 |
| 2011/0084900 A1 | * | 4/2011 | Jacobsen et al. .............. | 345/156 |
| 2011/0202270 A1 | * | 8/2011 | Sharma et al. ................ | 701/201 |
| 2011/0213681 A1 | * | 9/2011 | Shahid ........................ | 705/27.1 |
| 2011/0231862 A1 | * | 9/2011 | Walsh ............................ | 719/318 |
| 2011/0255514 A1 | * | 10/2011 | Olofsson et al. .............. | 370/331 |

(Continued)

FOREIGN PATENT DOCUMENTS

| | | |
|---|---|---|
| CN | 1679250 A | 10/2005 |
| CN | 101114848 A | 1/2008 |
| CN | 101438505 A | 5/2009 |
| CN | 101442330 A | 5/2009 |

*Primary Examiner* — Minh D Dao
(74) *Attorney, Agent, or Firm* — Altis Law Group, Inc.

(57) ABSTRACT

An exemplary embodiment of communication device includes a signal communication module, a first switch module, a processor, a second switch module, and a power amplifying module. The signal communication module, the first switch module, the processor, the second switch module, and the power amplifying module are electrically connected in series. The signal transceiver receives and sends a wireless communication signal. The first switch module and the second switch module are used for switching on corresponding receiving and sending paths of the wireless communication signal under the control of the processor. The power amplifying module is configured for amplifying and adjusting signal strength of the broadcast signal from the second switch module controlled by the processor.

18 Claims, 4 Drawing Sheets

(56) References Cited

U.S. PATENT DOCUMENTS

| | | | |
|---|---|---|---|
| 2012/0087430 A1* | 4/2012 | Forenza et al. | 375/267 |
| 2012/0123995 A1* | 5/2012 | Boot | 706/54 |
| 2012/0190386 A1* | 7/2012 | Anderson | 455/456.3 |
| 2012/0242501 A1* | 9/2012 | Tran et al. | 340/870.02 |
| 2012/0275319 A1* | 11/2012 | Peiris et al. | 370/252 |
| 2012/0282875 A1* | 11/2012 | Park et al. | 455/404.1 |

* cited by examiner

COMMUNICATION DEVICE AND COMMUNICATION METHOD EMPLOYING THE SAME

BACKGROUND

1. Technical Field

The disclosure generally relates to communication devices and methods, particularly, to a communication system and a communication method for transmitting wireless signals, such as Bluetooth signals, Wi-Fi signals, etc.

2. Description of the Related Art

Bluetooth technology, as a short distance radio technology, is widely used in existing communication devices, such as mobile phones, personal digital assistants (PDAs), for transmitting information among the communication devices or between the communication devices and wireless networks.

However, when Bluetooth is used for long distance communication, the signals have poor quality and may be interrupted because of channel interference, transmission loss and low signal transmitting power. The power of the portable electronic device may be used up more rapidly due to the high transmitting power of the Bluetooth signal. Therefore, it is difficult to meet the needs of long distance and long time communication for people.

Therefore, there is room for improvement within the art.

BRIEF DESCRIPTION OF THE DRAWINGS

Many aspects of a communication device and a communication method employing the same can be better understood with reference to the following drawings. The components in the drawings are not necessarily drawn to scale, the emphasis instead being placed upon clearly illustrating the principles of the exemplary communication device and communication method employing the same. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
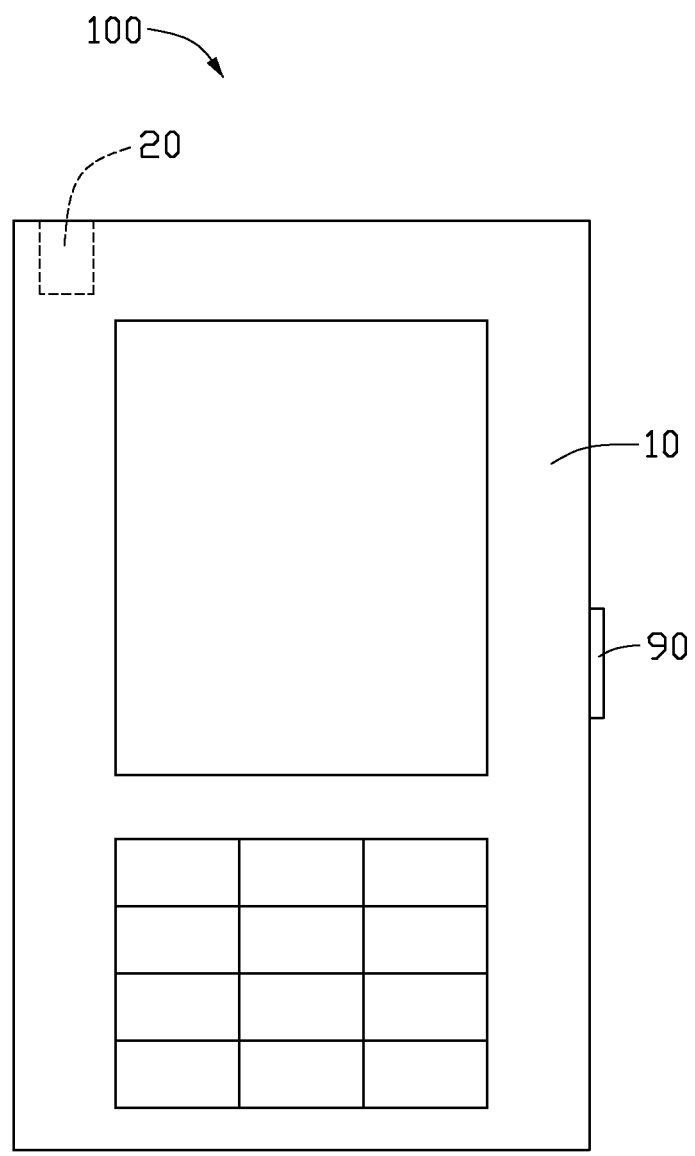
FIG. 1 is a schematic view of a communication device, according to an exemplary embodiment.
Figure 2:
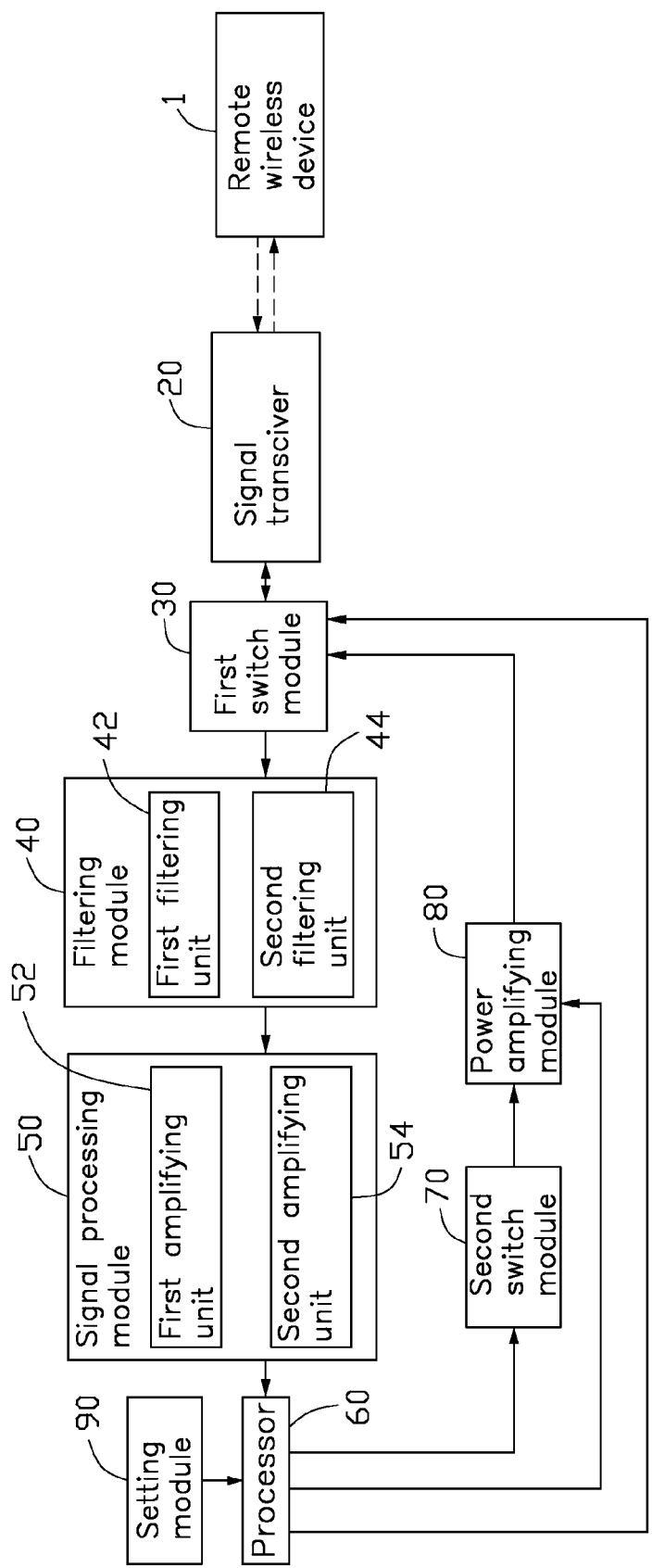
FIG. 2 is a block diagram of a remote wireless device and the communication device shown in FIG. 1.

FIGS. 1 and 2 show an exemplary embodiment of a communication device 100 for use with short distance wireless technology, such as Bluetooth, WiFi and so on, to transfer information. The communication device 100, such as a mobile phone, a PDA, etc., can transmit and receive WiFi signal and Bluetooth signal.

The communication device 100 includes a housing 10, a signal transceiver 20, a first switch module 30, a filtering module 40, a signal processing module 50, a processor 60, a second switch module 70, a power amplifying module 80, and a setting module 90. The first switch module 30, the filtering module 40, the signal processing module 50, the processor 60, the second switch module 70, and the power amplifying module 80 are electrically connected in series. The first switch module 30 is further electrically connected to the signal transceiver 20 and the processor 60. The processor 60 is further electrically connected to the power amplifying module 80 and the setting module 90. The signal transceiver 20, the first switch module 30, the filtering module 40, the signal processing module 50, the processor 60, the second switch module 70, and the power amplifying module 80 are disposed inside the housing 10. The setting module 90 is disposed outside the housing 10.

The signal transceiver 20 can be electrically connected with an existing transducer, such as an antenna. The signal transceiver 20 is configured for transmitting and receiving predetermined types of wireless communication signals, such as the Bluetooth signal and the WiFi signal, with a remote wireless device 1 communicating at the same predetermined signals.

The first switch module 30 can be such as a single pole double throw (SPDT) analog switch. The first switch module 30 is configured for selectively switching on corresponding receiving paths of the WiFi signal or the Bluetooth signal. The filtering module 40 includes a first filtering unit 42 and a second filtering unit 44. The first filtering unit 42 can be integrated with a high pass filter (HPF) and configured for transferring high frequency signal among the WiFi signal and filtering out unnecessary low frequency signals. The second filtering unit 44 can be integrated with a band pass filter (BPF), which is configured for transferring the Bluetooth signal while filtering out interference.

For example, when the signal transceiver 20 receives the WiFi signal, the first switch module 30 connects the signal transceiver 20 to the first filtering unit 42 and switches on the receiving path of the WiFi signal to transfer the WiFi signal. When the signal transceiver 20 receives the Bluetooth signal, the first switch module 30 switches on the receiving path of the Bluetooth signal and transfers the Bluetooth signal to the second filtering unit 44 through the first switch module 30.

The signal processing module 50 includes a first amplifying unit 52 and a second amplifying unit 54. The first amplifying unit 52 and the second amplifying unit 54 can be integrated with low noise amplifiers (LNAs), which are configured for reducing signal interference and improving signal to noise ratio (SNR) of the received signal from the filtering module 40. The first amplifying unit 52 and the second amplifying unit 54 are respectively configured for amplifying the WiFi signal and the Bluetooth signal.

The processor 60 can be integrated with the central processing unit (CPU), which is loaded with various control programs and a SNR reference value. The processor 60 is configured for receiving and processing the received signal, and sending a broadcast signal to the second switch module 70. The processor 60 is also configured for controlling the first switch module 30 and adjusting the amplifying level of the power amplifying module 80.

The second switch module 70 can also be an existing SPDT analog switch. The second switch module 70 is configured for automatically and selectively switching on corresponding sending paths of the WiFi signal and the Bluetooth signal under the control of the processor 60. For example, when the processor 60 sends the Bluetooth signal to the second switch module 70, the second switch module 70 switches on the sending path of the Bluetooth signal to send the Bluetooth signal.

The power amplifying module 80 can be a class AB linear power amplifier, which has two operation modes: bypass operation mode and linear amplification mode. When the power amplifying module 80 is in the bypass operation mode, the communication device 100 transfers WiFi signal and Bluetooth signal with the remote wireless device 1 using an weak signal strength. When the power amplifying module 80 works in the linear amplifying mode, the communication device 100 transfer WiFi signal and Bluetooth signal with the remote wireless device 1 using a strong signal strength, but using more power.

The signal strength of the power amplifying module 80 determines the transmission distances of the WiFi signal and the Bluetooth signal, so that the signal strength can be divided into different power levels according to different transmission distance. For example, when the signal strength of the power amplifying module 80 is set to about 100 milliwatts, the transmission distance of the Bluetooth signal is about 100 meters. When the signal strength of the power amplifying module 80 is set to about 2.5 milliwatts, then the Bluetooth signal can be sent about 10 meters.

The processor 60 controls the power amplifying module 80 to automatically adjust the signal strength of the broadcast signal by comparing the SNR reference value with SNR value of the received signal from the signal processing module 50, so that the power consumption of the communication device 100 is reduced. For example, when signal strength of the power amplifying module 80 is 100 milliwatts, and the SNR value of the wireless signal is larger than the SNR reference value, the power amplifying module 80 in a certain value (eg, 2 milliwatts, 3 milliwatts, etc.) automatically reduces the signal strength of the broadcast signal, until the SNR value of the wireless signal is about equal to or less than the SNR reference value.

The setting module 90 can be a typical operating device, such as a control panel. The setting module 90 is configured for choosing to receive the wireless signals such as WiFi signal or the Bluetooth signal to communicate with the remote wireless device 1. The setting module is further configured for choosing operation mode and power level of the power amplifying module 80 according to transmission distance.

Figure 3:
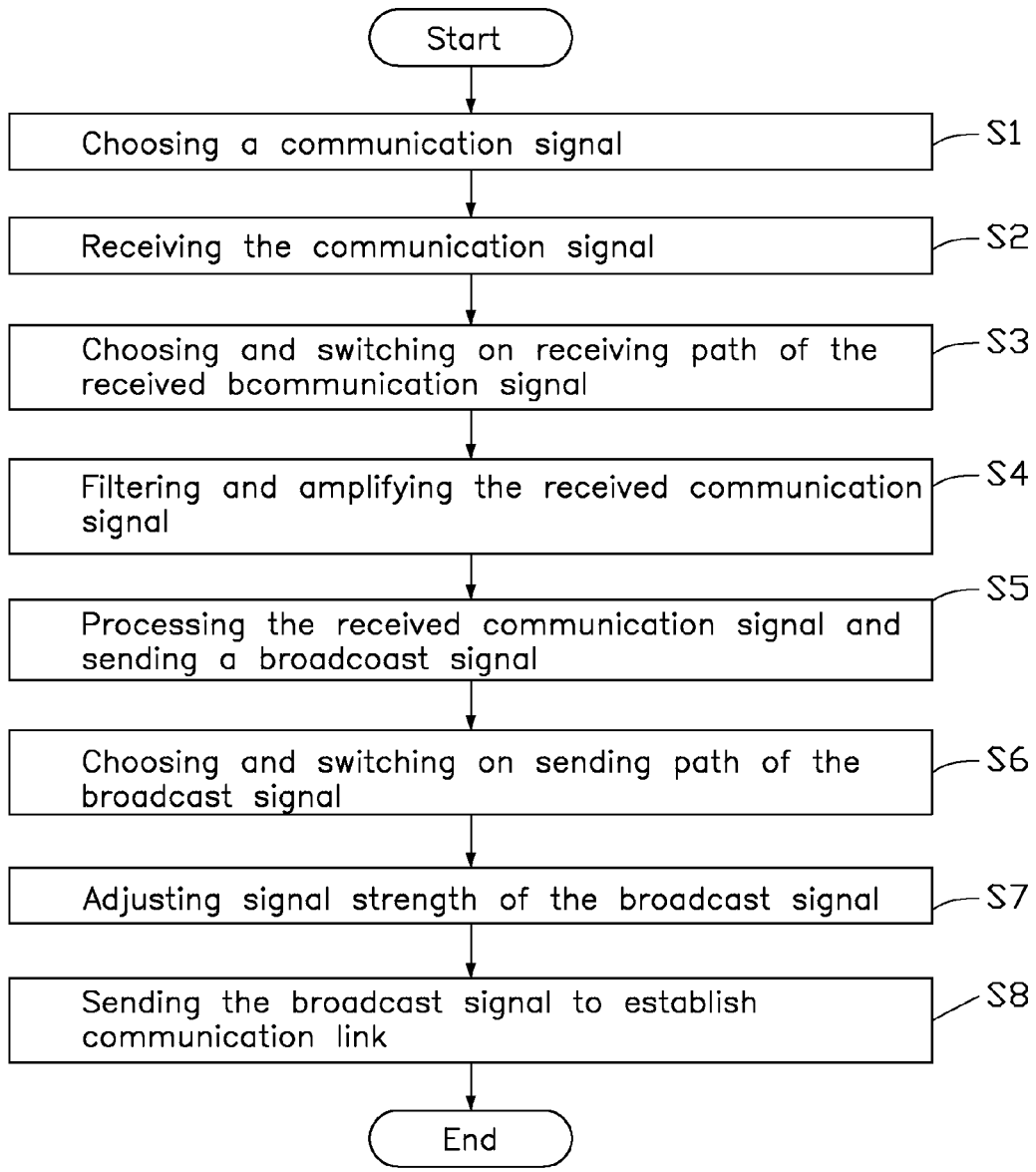
FIG. 3 is a flow chart illustrating of a communication method, according to an exemplary embodiment.

Further referring to FIG. 3, a communication method in accordance with an exemplary embodiment is depicted. The communication method uses the aforementioned communication device 100 to transmit short distance wireless signal, such as WiFi signal, Bluetooth signal. The communication method may at least include the following steps.

In step S1, the communication signal, such as the WiFi signal, the Bluetooth signal, etc., as a received signal is chosen by the setting module 90 of the communication device 100.

In step S2, the signal transceiver 20 receives the communication signal from the remote wireless device 1.

In step S3, the first switch module 30 receives and switches on a corresponding receiving path of the received communication signal controlled by the processor 60.

In step S4, the filtering module 40 filters out clutter and the signal processing module 50 amplifies the received communication signal.

In step S5, the processor 60 processes the received communication signal, such as modulation, demodulation, etc. and sends a broadcast signal.

In step S6, the second switch module 70 receives the broadcast signal and switches on the corresponding sending path of the broadcast signal under the control of the processor 60.

In step S7, the power amplifying module 80 adjusts signal strength of the broadcast signal controlled by the processor 60.

In step S8, the signal transceiver 20 sends the broadcast signal to establish communication link with the remote wireless device 1.

Figure 4:
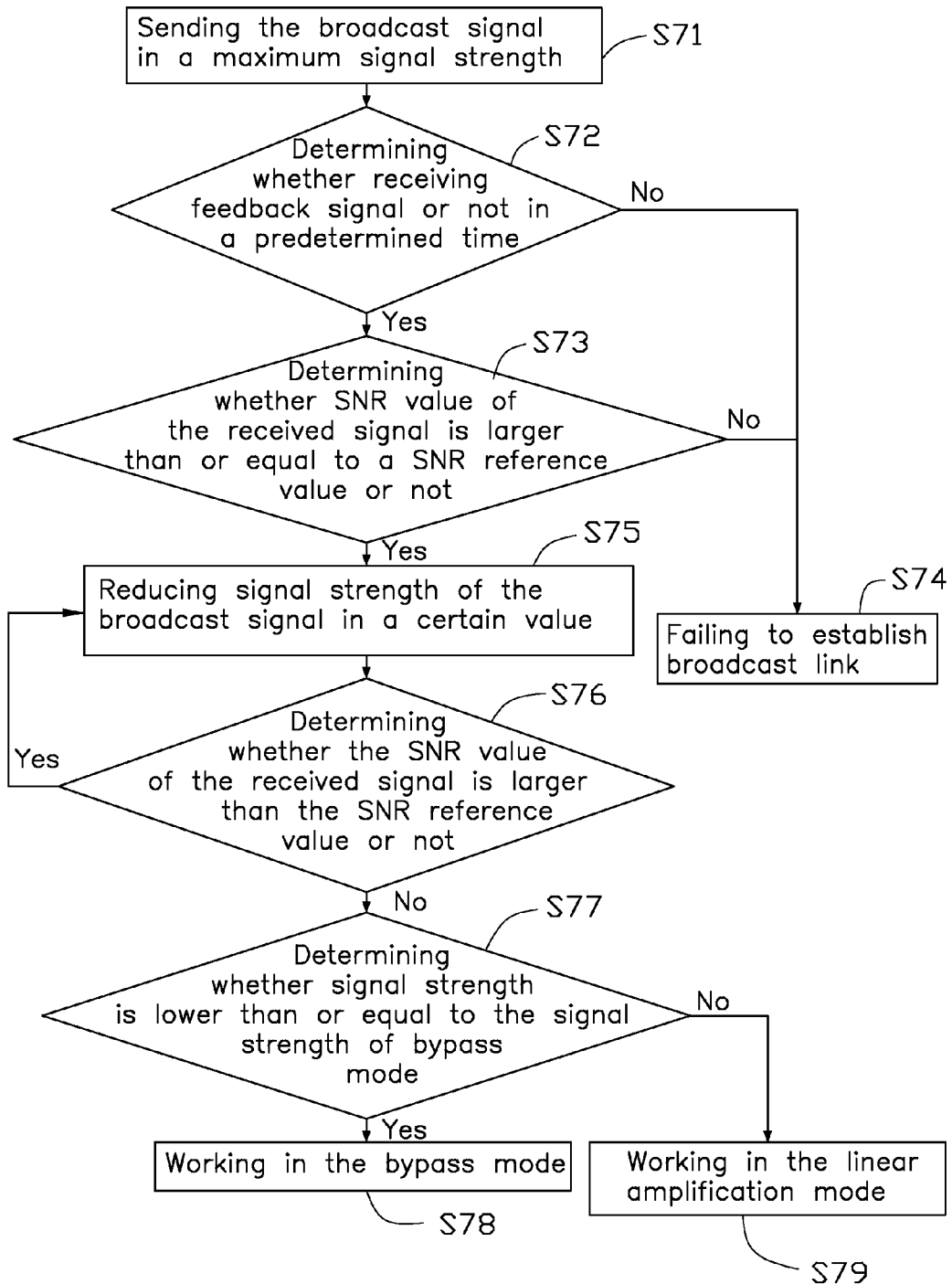
FIG. 4 is a flow chart illustrating step 7 of the communication method shown in FIG. 3.

Further referring to FIG. 4, the step S7 may at least include the following sub-steps.

In step S71, the power amplifying module 80 works in the linear amplification mode and sends the broadcast signal in a maximum signal strength to remote wireless device 1.

In step S72, the processor 60 determines whether the signal transceiver 20 receives a feedback signal from the remote wireless device 1 in a predetermined time (eg, 15 seconds, 20 seconds) or not. If the signal transceiver 20 receives the feedback signal in the predetermined time, the process goes to step S73, and if the signal transceiver 20 does not receive the feedback signal in the predetermined time, the process goes to step S74.

In step S73, the processor 60 determines whether the SNR value of the received signal from the signal processing module 50 is larger than or equal to the SNR reference value or not. If the SNR value is larger than or equal to the SNR reference value, the process goes to step S75, and if the SNR value is less than the SNR reference value, the process goes to step S74.

In step S74, the communication device 100 may not receive the feedback signal from the remote wireless device 1 and fails to establish communication link with the remote wireless device 1.

In step S75, the power amplifying module 80 automatically reduces the signal strength of the broadcast signal in a certain value (eg, 2 milliwatts, 3 milliwatts, etc.).

In step S76, the processor 60 determines whether the SNR value of the received signal from the signal processing module 50 is larger than the SNR reference value or not. If the SNR value is larger than the SNR reference value, the process repeats step S75, and if the SNR value is equal to or less than the SNR reference value, the process goes to step S77.

In step S77, the processor 60 determines whether the signal strength of broadcast signal is lower than or equal to the signal strength of the broadcast signal when the power amplifying module 80 working in bypass mode. If so, the process goes to step S78, and if not, the process goes to step S79.

In step S78, the power amplifying module 80 works in the bypass mode to send the broadcast signal.

In step S79, the amplifying module 80 works in the linear amplification mode to transmit broadcast signal and save power.

In the communication device 100 and communication method employing the same of the exemplary embodiment, both the WiFi signal and the Bluetooth signal share the power amplifying module 80, so that the power amplifying module 80 can automatically adjust WiFi signal, Bluetooth signal and other wireless signal under the control of the processor 60. Therefore, the communication device 100 not only extends transmission distance of the WiFi signal and the Bluetooth signal, but also reduces the power consumption, which meets the needs of the consumers.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of exemplary disclosure to the full extent indicated by the broad general meaning of the terms in which the appended claims are expressed.

What is claimed is:

1. A communication device, comprising:
   a signal transceiver for receiving and sending a wireless communication signal;
   a first switch module electrically connected to the signal transceiver, and configured for switching on corresponding receiving paths of the wireless communication signal to transfer the wireless communication signal;

a processor electrically connected to the first switch module, and configured for processing the wireless communication signal from the first switch module and sending a corresponding broadcast signal;

a second switch module electrically connected to the processor, and configured for receiving the broadcast signal and switching on corresponding sending paths of broadcast signal to send the broadcast signal under the control of the processor; and a power amplifying module electrically connected to the first switch module, the processor and the second switch module, wherein the processor controls the power amplifying module to adjust signal strength of the broadcast signal.

2. The communication device as claimed in claim 1, wherein the wireless communication signal and the broadcast signal are either one of WiFi signal and Bluetooth signal, both the WiFi signal and the Bluetooth signal share the power amplifying module.

3. The communication device as claimed in claim 2, wherein the first switch module is configured for selectively switching on corresponding receiving path of the WiFi signal or the Bluetooth path controlled by the processor, and the second switch module is configured for selectively switching on corresponding sending path of the WiFi signal or the Bluetooth signal under the control of the processor.

4. The communication device as claimed in claim 2, further comprising a setting module electrically connected to the processor, the setting module being configured for choosing to receive the WiFi signal or the Bluetooth signal, and choosing operation mode and power level of the power amplifying module according to transmission distance of the WiFi signal or the Bluetooth signal.

5. The communication device as claimed in claim 1, further comprising a filtering module electrically connected to the first switch module, wherein the filtering module includes a first filtering unit and a second filtering unit, the first filtering unit and the second filtering unit are configured for filtering clutter from the wireless communication signal to reduce interference.

6. The communication device as claimed in claim 5, further comprising a signal processing module electrically connected to the filtering module and the processor, wherein the signal processing module includes a first amplifying unit and a second amplifying unit, the first amplifying unit and the second amplifying unit are configured for amplifying the received signal from the filtering module and improving the signal to noise ratio of the received signal.

7. A communication device, comprising:

a signal transceiver for receiving and sending a wireless communication signal;

a first switch module electrically connected to the signal transceiver, and configured for switching on corresponding receiving paths of the wireless communication signal to transfer the wireless communication signal;

a filtering module electrically connected to the first switch module, and configured for filtering clutter from the received signal from the first switch module;

a signal processing module electrically connected to the filtering module, and configured for amplifying the received signal from the filtering module;

a processor electrically connected to the first switch module, and configured for processing the received signal from the first switch module and sending a corresponding broadcast signal;

a second switch module electrically connected to the processor, and configured for receiving the broadcast signal and switching on corresponding sending paths of the broadcast signal under the control of the processor; and a power amplifying module electrically connected to the first switch module, the processor, and the second switch module, wherein the processor controls the power amplifying module to adjust signal strength of the broadcast signal.

8. The communication device as claimed in claim 7, wherein the wireless communication signal, the received signal and the broadcast signal are either one of WiFi signal and Bluetooth signal, and both the WiFi signal and the Bluetooth signal share the power amplifying module.

9. The communication device as claimed in claim 8, wherein the first switch module is configured for selectively switching on corresponding receiving path of the WiFi signal or the Bluetooth signal controlled by the processor, and the second switch module automatically switches on corresponding sending path of the WiFi signal or the Bluetooth signal controlled by the processor.

10. The communication device as claimed in claim 8, wherein the filtering module includes a first filtering unit and a second filtering unit, the first filtering unit is used for transferring the WiFi signal and filtering clutter to reduce interference, and the second filtering unit is used for transferring Bluetooth signal and filtering clutter from the Bluetooth signal to reduce interference.

11. The communication device as claimed in claim 8, wherein the signal processing module including a first amplifying unit and a second amplifying unit, the first amplifying unit is used for amplifying the WiFi signal and improving the signal to noise ratio of the WiFi signal, and the second amplifying unit is configured for amplifying Bluetooth signal and improving the signal to noise ratio of the Bluetooth signal.

12. The communication device as claimed in claim 8, further including a setting module electrically connected to the processor, the setting module being configured for choosing to receive the WiFi signal or the Bluetooth signal, and choosing an operation mode and power level of the power amplifying module according to transmission distance of the WiFi signal or the Bluetooth signal.

13. A communication method for transmitting wireless communication signals between a communication device and a remote wireless device, the communication method comprising steps of:

choosing a wireless communication signal of predetermined types as a received signal by the communication device;

receiving the wireless communication signal from the remote wireless device;

choosing and switching on a receiving path for the received signal;

filtering and amplifying the received signal;

processing the received signal and sending a broadcast signal;

adjusting the signal strength of the broadcast signal, the step of adjusting signal strength of the broadcast signal includes sub-steps of:

sending the broadcast signal in a maximum signal strength to the remote wireless device, receiving a feedback signal from the remote wireless device, determining whether a noise ratio value of the received signal is larger than a noise ratio reference value or not by the communication device, reducing the signal strength of the broadcast signal in a certain value, if the noise ratio value of the received signal is larger than a noise ratio reference value, and choosing the signal strength of the broadcast signal; and sending the broadcast signal after adjusting.

14. The communication method as claimed in claim 13, further including a step of choosing and switching on a sending path of the broadcast signal to the remote wireless device.

15. The communication method as claimed in claim 13, wherein the step of adjusting signal strength of the broadcast signal further includes a step of determining whether receiving the feedback signal or not in a predetermined time.

16. The communication method as claimed in claim 15, wherein the step of adjusting the signal strength of the broadcast signal further includes a step of failing to establish communication link with the remote wireless device, if the feedback signal is not received in a predetermined time.

17. The communication method as claimed in claim 16, wherein the wireless communication signal of predetermined types is either one of WiFi signal and Bluetooth signal.

18. A communication method for transmitting wireless communication signals between a communication device and a remote wireless device, the communication method comprising steps of:
receiving the wireless communication signals;
switching on corresponding receiving paths of the wireless communication signal in the communication device to transfer the wireless communication signals;
processing the wireless communication signals and sending a corresponding broadcast signal;
switching on corresponding sending paths of the broadcast signal in the communication device to send the broadcast signal;
adjusting signal strength of the broadcast signal, the step of adjusting signal strength of the broadcast signal includes sub-steps of:
sending the broadcast signal in a maximum signal strength to the remote wireless device,
receiving a feedback signal from the remote wireless device,
determining whether a noise ratio value of the received signal is larger than a noise ratio reference value or not by the communication device,
reducing the signal strength of the broadcast signal in a certain value, if the noise ratio value of the received signal is larger than a noise ratio reference value, and choosing the signal strength of the broadcast signal; and
sending the broadcast signal after adjusting.

* * * * *